(12) United States Patent
Shao et al.

(10) Patent No.: US 11,438,426 B1
(45) Date of Patent: Sep. 6, 2022

(54) SYSTEMS AND METHODS FOR INTELLIGENT SESSION RECORDING

(71) Applicant: AURYC, INC., Los Altos, CA (US)

(72) Inventors: Feng Shao, Santa Clara, CA (US); Amod Setlur, Portola Valley, CA (US); Jinlin Wang, Los Altos, CA (US)

(73) Assignee: AURYC, INC., Los Altos, CA (US)

( * ) Notice: Subject to any disclaimer, the term of this patent is extended or adjusted under 35 U.S.C. 154(b) by 0 days.

(21) Appl. No.: 17/243,419

(22) Filed: Apr. 28, 2021

(51) Int. Cl.
*H04L 67/146* (2022.01)
*H04L 67/133* (2022.01)
*H04L 67/50* (2022.01)
*H04L 67/143* (2022.01)

(52) U.S. Cl.
CPC .......... *H04L 67/146* (2013.01); *H04L 67/143* (2013.01); *H04L 67/22* (2013.01); *H04L 67/40* (2013.01)

(58) Field of Classification Search
None
See application file for complete search history.

(56) References Cited

U.S. PATENT DOCUMENTS

| | | | | |
|---|---|---|---|---|
| 9,154,556 | B1* | 10/2015 | Dotan | H04L 67/14 |
| 9,245,026 | B1* | 1/2016 | Hoover | G06Q 30/06 |
| 2013/0136253 | A1* | 5/2013 | Liberman Ben-Ami | |
| | | | | H04M 3/5191 |
| | | | | 379/265.09 |
| 2015/0067051 | A1* | 3/2015 | Kim | H04L 67/2833 |
| | | | | 709/204 |
| 2015/0245167 | A1* | 8/2015 | Bobrow | H04L 41/12 |
| | | | | 455/41.2 |
| 2016/0269497 | A1* | 9/2016 | Glommen | H04L 67/22 |
| 2019/0196899 | A1* | 6/2019 | Sylvester, II | G06Q 20/4016 |
| 2020/0084280 | A1* | 3/2020 | Malhotra | G06N 5/043 |

* cited by examiner

*Primary Examiner* — James A Edwards
(74) *Attorney, Agent, or Firm* — Dinsmore & Shohl LLP

(57) ABSTRACT

A computer-implemented method, comprising: receiving and storing, by a computer device, messages of one or more browsing sessions of a website in a first database; determining, by the computer device, whether one of the one or more browsing sessions is terminated; upon determining the one browsing session being terminated, fetching, by the computer device, the messages of the terminated browsing session; determining, by the computer device, one or more tags based at least on the messages of the terminated browsing session; and storing, by the computer device, the terminated browsing session with the one or more tags into a second database for data analysis.

17 Claims, 6 Drawing Sheets

SYSTEMS AND METHODS FOR INTELLIGENT SESSION RECORDING

TECHNICAL FIELD

The disclosure relates generally to computer technology, particularly, to a method and a system to intelligently manage users' browsing sessions on a website.

BACKGROUND

People frequently interact with and utilize computer devices to perform various tasks. For example, computers connected through the internet have been serving as terminals for information exchange, goods purchase, etc. To measure and improve their user experience, website and eCommerce business owners usually have a great interest in tracking and understanding user behavior. One common way is to analyze data and information collected through the users' browsing sessions of a website. However, due to limitations in budget and resources, it is often impossible for website and eCommerce business owners to process and store the overwhelming amount of data collected from all the browsing sessions of the website. Therefore, for website and eCommerce business owners, it is desirable to intelligently select, process, analyze and store only the data that is important to them.

SUMMARY

Various embodiments of the specification include, but are not limited to, methods, systems and non-transitory computer-readable media for intelligently processing browsing sessions of a website.

In some embodiments, a computer-implemented method, comprises: receiving and storing, by a computer device, messages of one or more browsing sessions of a website in a first database; determining, by the computer device, whether one of the one or more browsing sessions is terminated; upon determining the one browsing session being terminated, fetching, by the computer device, the messages of the terminated browsing session; determining, by the computer device, one or more first tags based at least on the messages of the terminated browsing session; and storing, by the computer device, the terminated browsing session with the one or more first tags into a second database for data analysis.

In some embodiments, the method further comprises: receiving a data analysis request; determining one or more second tags associated with the data analysis request; retrieving the terminated browsing session from the second database if the one or more first tags match the one or more second tags; and returning the terminated browsing session in a response to the data analysis request.

In some embodiments, determining one or more first tags further comprises: determining a third tag for the terminated browsing session based on a sampling rate.

In some embodiments, determining one or more tags based at least on the messages of the terminated browsing sessions comprises: searching the messages for one or more user actions represented as API calls to the website; and determining the one or more tags for the terminated browsing session based on API calls.

In some embodiments, the API calls comprise at least one of an order-placing call, an add-to-cart call, a payment call, a like call, or an add-to-list call.

In some embodiments, receiving messages of one or more browsing sessions of the website comprises: monitoring activity of at least one of a mouse, a cursor, a keyboard, a microphone, or a touch sensor.

In some embodiments, determining the one browsing session being terminated comprises: identifying a most recently received message of the one browsing session; determining a time difference between a timestamp of the most recently received message and a current timestamp; in response to the time difference being greater than a threshold, determining the one browsing session as terminated.

In some embodiments, fetching the messages of the terminated browsing session comprises: determining whether a number of terminated browsing sessions in the first database is greater than a threshold; and in response to the number of terminated browsing sessions being greater than the threshold, fetching the terminated browsing sessions as a batch.

In some embodiments, the method further comprises: updating a counter representing the number of terminated browsing sessions in the first database, wherein the determining whether a number of terminated browsing sessions in the first database is greater than a threshold comprises: comparing the counter against the threshold.

In some embodiments, a system, comprising one or more processors and one or more non-transitory computer-readable memories coupled to the one or more processors and configured with instructions executable by the one or more processors to cause the system to perform operations, comprises: receiving messages of one or more browsing sessions of a website, wherein the one or more browsing sessions are stored in a first database; storing the messages into corresponding browsing sessions in the first database; determining whether one of the one or more browsing sessions is terminated; upon determining the one browsing session being terminated, fetching the messages of the terminated browsing session; determining one or more first tags based at least on the messages of the terminated browsing session; and storing the terminated browsing session with the one or more first tags into a second database for data analysis.

In some embodiments, the system further comprises: receiving a data analysis request; determining one or more second tags associated with the data analysis request; retrieving one or more terminated browsing sessions from the second database that are associated with the one or more tags; and returning the one or more terminated browsing sessions as a response to the data analysis request.

In some embodiments, determining one or more first tags based at least on the messages of the terminated browsing session further comprises: generating one or more rules; and tagging the terminated browsing session by applying the one or more rules to the messages.

In some embodiments, the one or more rules comprise: a mapping relationship between the one or more first tags and one or more user events in the messages of the terminated browsing session, wherein the one or more user events comprise at least one of an order-placing event, an add-to-cart event, a payment event, a like event, or an add-to-list event.

In some embodiments, receiving messages of one or more browsing sessions of the website comprises: monitoring activity of at least one of a mouse, a cursor, a keyboard, a microphone, or a touch sensor.

In some embodiments, determining the one browsing session being terminated comprises: identifying a most recently received message of the one browsing session; determining a time difference between a timestamp of the most recently received message and a current timestamp; in response to the time difference being greater than a threshold, determining the one browsing session as terminated.

In some embodiments, fetching the messages of the terminated browsing session comprises: determining whether a number of terminated browsing sessions in the first database is greater than a threshold; and in response to the number of terminated browsing sessions being greater than the threshold, fetching the terminated browsing sessions as a batch.

In some embodiments, the system further comprises: updating a counter representing the number of terminated browsing sessions in the first database, wherein the determining whether a number of terminated browsing sessions in the first database is greater than a threshold comprises: comparing the counter against the threshold.

In some embodiments, one or more non-transitory computer-readable storage media storing instructions executable by one or more processors, wherein execution of the instructions causes the one or more processors to perform operations comprises: receiving messages of one or more on-going browsing sessions of a website, wherein the one or more on-going browsing sessions are stored in a first database; storing the messages into corresponding on-going browsing sessions in the first database; determining whether one of the one or more on-going browsing sessions is terminated; upon determining the one browsing session being terminated, fetching the messages of the terminated browsing session; determining one or more first tags based at least on the messages of the terminated browsing session; and storing the terminated browsing session with the one or more first tags into a second database for data analysis.

In some embodiments, determining one or more first tags based at least on the messages of the terminated browsing session comprises: generating one or more rules; and tagging the terminated browsing session by applying the one or more rules to the messages.

In some embodiments, determining the one browsing session being terminated comprises: identifying a most recently received message of the one browsing session; determining a time difference between a timestamp of the most recently received message and a current timestamp; in response to the time difference being greater than a threshold, determining the one browsing session as terminated.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the specification. It is to be understood that the foregoing general description and the following detailed description are exemplary and explanatory only, and are not restrictive of the specification, as claimed.

BRIEF DESCRIPTION OF THE DRAWINGS

Non-limiting embodiments of the specification may be more readily understood by referring to the accompanying drawings in which.

DETAILED DESCRIPTION

Non-limiting embodiments of the present specification will now be described with reference to the drawings. Particular features and aspects of any embodiment disclosed herein may be used and/or combined with particular features and aspects of any other embodiment disclosed herein. Such embodiments are by way of example and are merely illustrative of a small number of embodiments within the scope of the present specification. Various changes and modifications obvious to one skilled in the art to which the present specification pertains are deemed to be within the spirit, scope, and contemplation of the present specification as further defined in the appended claims.

Figure 1:
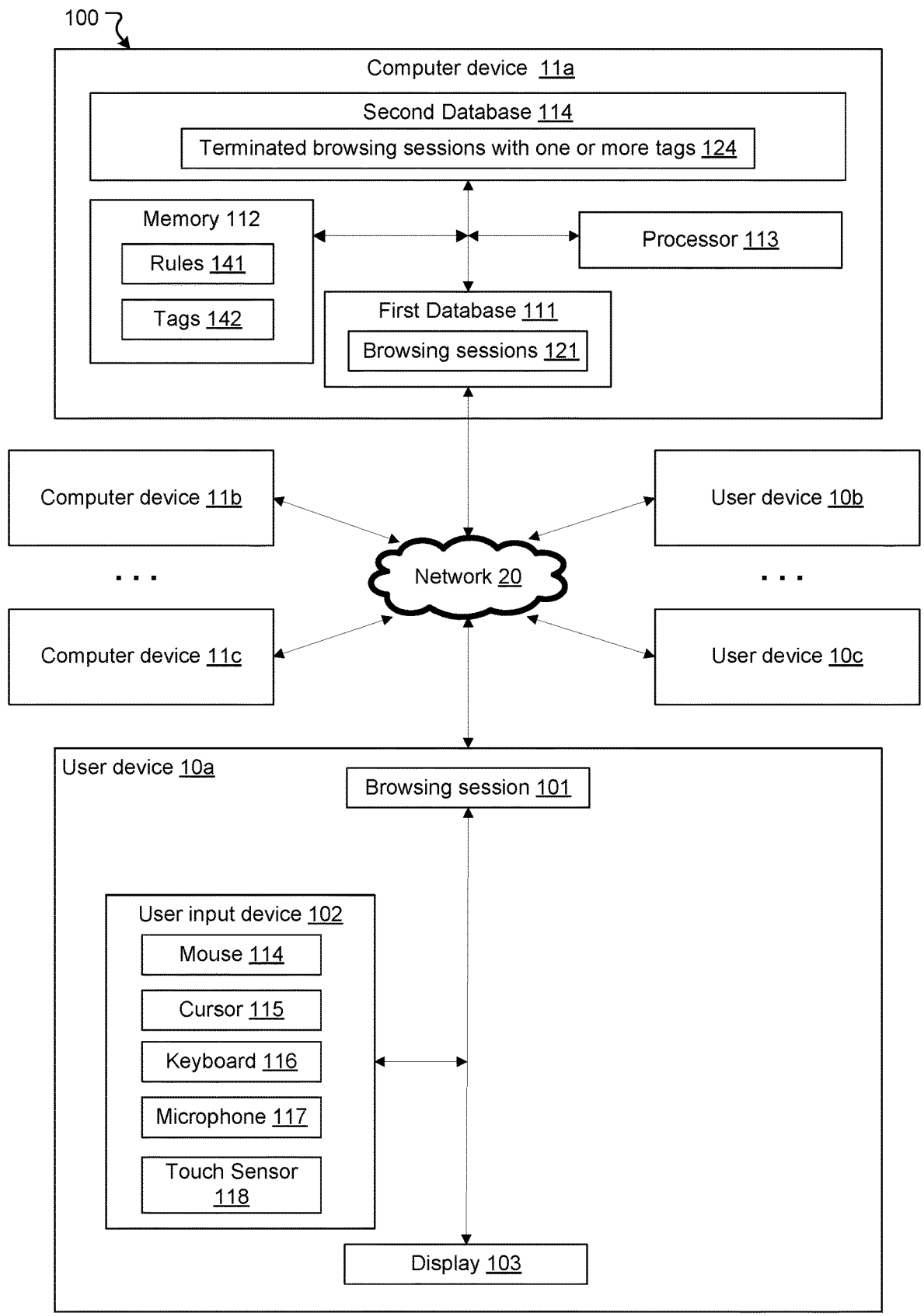
FIG. 1 is a block diagram illustrating a human-machine interaction system, in accordance with various embodiments of the disclosure.

FIG. 1 is a block diagram illustrating a human-machine interaction system 100, in accordance with various embodiments of the present disclosure. The system 100 may also be referred to as a system for monitoring and stimulating user actions to contents retrieved from a network. The system 100 may include one or more user devices (e.g., user devices 10a, 10b, 10c, etc.) and one or more computer devices (e.g., computer devices 11a, 11b, 11c, etc.) coupled together through a network 20. The user devices and computer devices may have various embodiments, such as laptops, desktops, pads, e-readers, cellphones, wearable devices, Google Glasses, and the like. Some of the components shown in FIG. 1, such as the user devices 10b and 10c and the computer devices 11b and 11c may be optional. The network 20 may be any type of network, such as the Internet (e.g., based on cables, optical fibers, or wireless connections), a nationwide cellular network, a local wireless network (e.g., Bluetooth or WiFi), or a wired network.

In some embodiments, the user devices may have various implementations. In some embodiments, the user device 10a may comprise a browsing session 101, a user input device 102, and a display 103, some of which may be optional. In some embodiments, the browsing session 101, the user input device 102, and the display 103 may be operatively connected to each other via a bus or other types of communication channels. In some embodiments, the user device 10a may include fewer, more, or alternative components than those shown in FIG. 1. The user devices 10b and 10c may be similar to the user device 10a.

In some embodiments, the browsing session 101 may include a browser (e.g., Chrome), a cookie, and transceivers for communications. In some embodiments, contents of a website (e.g., products of an eCommerce website) may be displayed on the user device 10*a* through the browser. In some embodiments, the cookie may memorize user data generated through the user session (e.g. add items to a cart on the eCommerce website). In some embodiments, the transceivers may be configured for two-way communication among the user device 10*a*, the other user devices, and various computing devices. In some embodiments, the browsing session 101 may send and receive data from the network 20.

In some embodiments, the user input device 102 may comprise a mouse 114, a cursor 115, a keyboard 116, a microphone 117, and a touch sensor 118. Each of the user input devices may be configured to capture a user input, e.g., a click or a screen cursor movement action through the mouse 114 and the cursor 115, a keyboard entry through the keyboard 116, a voice command through the microphone 117, or a touch command through the touch sensor 118.

In some embodiments, the display 103 may be configured to provide visual data to a user. In some embodiments, the visual data may be related to the content provided through the internet (e.g. products on an eCommerce website). In some embodiments, the graphical user interface may be configured to receive user input, e.g., via a touch screen or a normal screen coupled to a mouse. In some embodiments, the user input may comprise instructions to manipulate, edit, or use the visual data.

The computer devices may have various implementations. In some embodiments, the computer device 11*a* may comprise a first database 111, a memory 112, a processor 113, and a second database 114, some of which may be optional. The first database 111, the memory 112, the processor 113, and the second database 114 may be operatively connected to each other via a bus or other types of communication channels. In some embodiments, the computer devices 11*a* may include many more components than those shown in FIG. 1. However, it is not necessary to show all of these components in order to disclose an illustrative embodiment. The computer devices 11*b* and 11*c* may be similar to the computer device 11*a*.

The first database 111 may include transitory and/or non-transitory storage media or memories configured to store browsing sessions 121. The first database 111 may include one or more memory units (e.g., a flash memory card, a random access memory (RAM), a read-only memory (ROM), a cross-platform document-oriented database system (MongoDB), and the like). In some embodiments, inputs from the browsing session 101 may be conveyed to and stored within the first database 111 as browsing sessions 121.

In some embodiments, as determined by the processor 113, the browsing sessions 121 may include one or more browsing sessions that satisfy at least one rule within rules 141. In some embodiments, as determined by the processor 113, the browsing sessions 121 may contain one or more browsing sessions that are terminated and/or one or more browsing sessions that are still in progress. In some embodiments, a browsing session of the browsing sessions 121 may include one or more messages that contain information and/or data on user activities or actions within the browsing session. For example, a browsing session may contain one or more messages that indicated that a user browsed content of a website, clicked add to cart of certain products but had not placed the order, and/or had placed an order during the browsing session.

The memory 112 may include transitory and/or non-transitory storage media or memories configured to store data, logic, code, and/or program instructions executable by the processor 113 for performing one or more functions, steps, and/or methods disclosed herein. The memory 112 may include one or more memory units (e.g., flash memory card, random access memory (RAM), read-only memory (ROM), and the like). In some embodiments, the memory 112 may store the rules 141 and the tags 142. In some embodiments, inputs from the browsing session 101 may be conveyed to and stored within the memory 102. Although FIG. 1 depicts a single memory 102, one of skill in the art would appreciate that this is not intended to be limiting, and that the computer device 11*a* may include a plurality of memory units of the memory.

The rules 141 may include one or more configurable rules involving one or more parameters. In some embodiments, a rule may be applied to one or more browsing sessions 121 based on the one or more parameters. The one or more parameters may be inputs or states of a browsing session (e.g. the browsing session 101) in a user device (e.g. the user devices 10*a*, 10*b*, 10*c*, etc.). In some embodiments, many types of parameters associated with the browsing session may be defined. For example, in some embodiments, a business owner of an eCommerce website may define one or more parameters as browsing sessions where users clicked "add to cart" but did not place an order, browsing sessions where users placed an order, and browsing sessions based on a random sampling of a threshold percentage, etc. In some embodiments, each parameter may be monitored as a state parameter or an input parameter.

In some embodiments, the rules (e.g. the rules 141) may be created, defined, configured, modified, or otherwise controlled through the computer device 11*a* and/or a device coupled to the computer device 11*a*, such as the computer device 11*b*, the computer device 11*c*, the user device 10*a*, the user device 10*b*, or the user device 10*c*. The rules may be defined by a user (e.g., via a rule authoring interface providing users options to achieve the control), an algorithm (e.g., a machine learning algorithm), etc. Each defined rule may comprise a logic condition associating the one or more parameters with assigned weights. The first database 111 may retrieve, display, configure, or apply the rules. For example, in some embodiments, the first database 111 may present the one or more parameters to the computer devices 11*a*-11*c* or the user devices 10*a*-10*c* for users to configures the rules 141. A user, e.g., a merchant, an internet administrator, an eCommerce website owner, or a programmer, may define, configure, or modify the rules by liking the parameters with logic conjunctions, logic conditions, etc. For example, a defined rule associating user activity on an eCommerce website may comprise: collect user data for a threshold number of browsing sessions where users clicked add to cart but did not place an order, collect user data for a threshold number of browsing sessions where users placed an order, and/or collect user data for browsing sessions based on a threshold percentage of random sampling.

Once defined, the rules can be transmitted, updated, or otherwise pushed from one device (e.g. a computer device, a user device, etc.) to one or more devices. Therefore, a rule may be created or defined by a first device and executed by the same or a different device. For example, in some embodiments, the processor 113 may apply one or more rules 141 to a browsing session and determine the browsing session satisfies at least one rule of the rules 141 and should be stored into the first database 111 as one of the browsing sessions 121.

The tags 142 may contain one or more tags that each corresponds to a rule of the rules 141. For example, a tag "purchasers" may be corresponding to a rule that "a user placed an order during a browsing session." For another example, a tag "sampled" may be corresponding to a rule that "a browsing session is stored and processed based on a random sampling."

In some embodiments, the processor 113 may determine that a browsing session of the browsing sessions 121 has been terminated. The processor 113 may then determine, by applying each rule of the rules 141 to messages of the terminated browsing session, that the browsing session satisfies one or more rules of the rules 141. In such an event, for each satisfied rule, the processor 113 may tag the terminated browsing session with a corresponding tag. In some embodiments, the tagged browsing session may be stored in the second database 114 as the terminated browsing sessions with one or more tags 124.

The processor 113 may include one or more processors, such as a programmable processor (e.g., a central processing unit (CPU)). The processor 113 may be configured to perform one or more methods disclosed within this disclosure. In some embodiments, the processor 103 may be a central processing unit configured to process one or more functions, methods, or steps as disclosed herein. Although FIG. 1 depicts a single processor 113, one skilled in the art would appreciate that this is not intended to be limiting, and that the computer device 11a may include a plurality of processing units.

The second database 114 may include transitory and/or non-transitory storage media or memories configured to store the terminated browsing sessions with one or more tags 124. The second database 112 may include one or more memory units (e.g., flash memory card, random access memory (RAM), read-only memory (ROM), and the like).

In some embodiments, after the browsing sessions 121 are processed by the processor 113, the browsing sessions 121 may be considered to have been terminated, satisfied one or more rules of the rules 141, and tagged with one or more tags of the tags 142. In such a case, the browsing sessions 121 may be conveyed to and stored in the second database 114 as the terminated browsing sessions with one or more tags 124. In some embodiments, the terminated browsing sessions with one or more tags 124 may be grouped, defined, configured, modified, or otherwise controlled through the computer device 11a and/or a device coupled to the computer device 11a, such as the computer device 11b, the computer device 11c, the user device 10a, the user device 10b, or the user device 10c.

In some embodiments, a user may make a data analysis request on the browsing sessions through a computer device (e.g., the computer devices 11a, 11b, 11c, etc.) or a user device (e.g., the user devices 10a, 10b, 10c, etc.). In some embodiments, the terminated browsing sessions with one or more tags 124 may be retrieved, based on the one or more tags attached, in response to the data analysis request from the second database 114.

Figure 2:
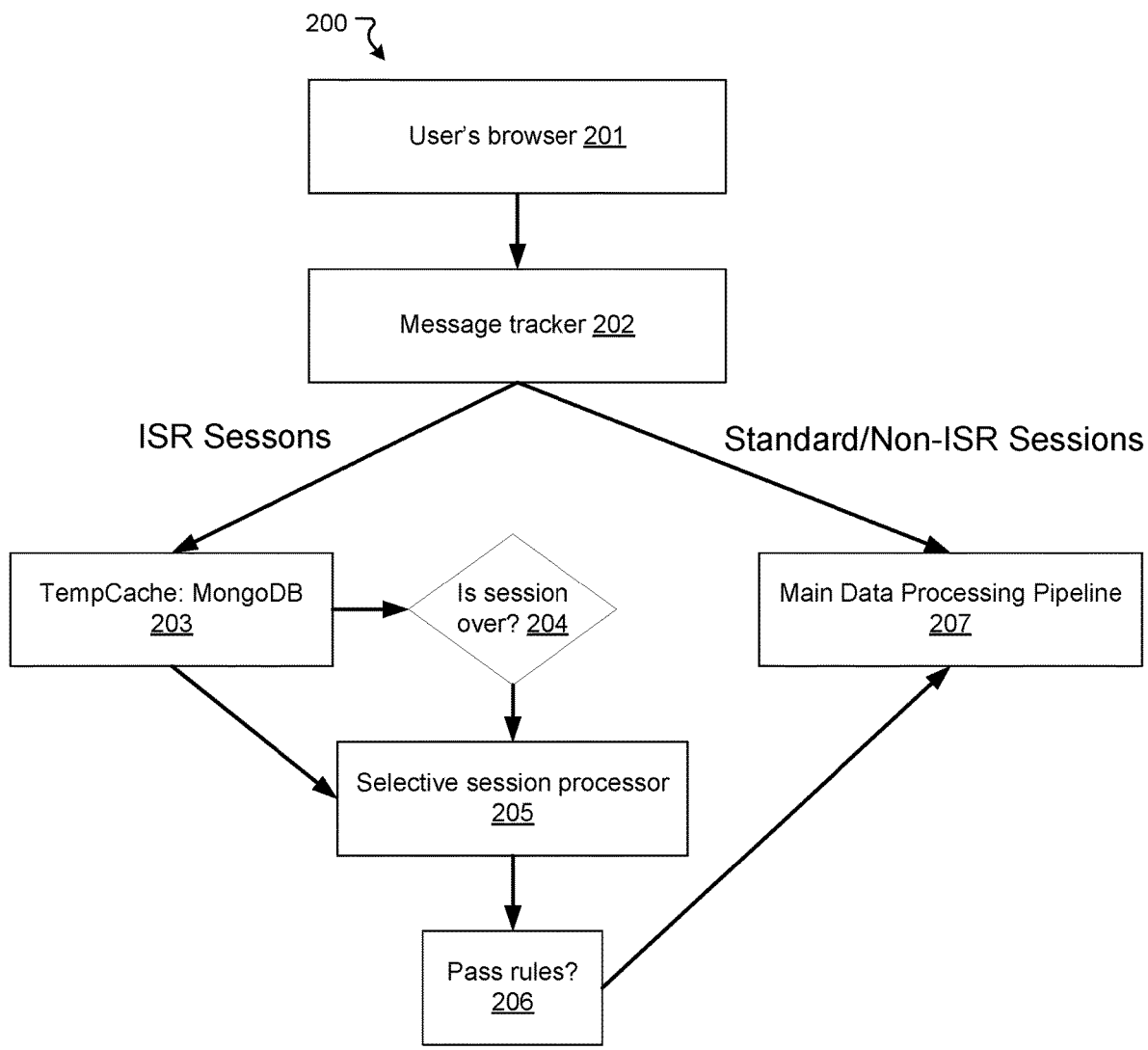
FIG. 2 illustrates an exemplary block diagram for a method to intelligently process browsing sessions of a website, in accordance with various embodiments of the disclosure.

FIG. 2 illustrates an exemplary block diagram for a method 200 to intelligently process browsing sessions of a website, in accordance with various embodiments of the disclosure. The method 200 may comprise a number of steps, some of which may be optional or may be rearranged in another order. One or more steps of the method 200 may be implemented by one or more components of the system 100, e.g., one or more of the user devices 10a, 10b, and 10c and/or one or more of the computing devices 11a, 11b, and 11c, or any other suitable system.

In some embodiments, a user's browser 201 may be associated with a user device (e.g., the user device 10a) through which a user may visit a website (e.g., an eCommerce website). The user's browser 201 may be displayed on a user device (e.g., the user device 10a) through a display (e.g., the display 103). In some embodiments, a user may start a browsing session of a website (e.g., an eCommerce website) through the user's browser 201. In the browsing session, the user may receive contents of the website through the browser 201. For example, a user who is visiting the eCommerce website may view contents, such as products, prices, images, etc., through the user's browser 201.

In some embodiments, a user may perform different activities in response to contents displayed on the user's browser 201. For example, a user who is visiting the eCommerce website may take actions such as adding a product to a cart (e.g., a virtual shopping cart), liking a product (e.g., providing positive rating and/or feedbacks), adding a product to a list (e.g., a wish-list or a shopping list), placing an order, making a payment, and/or leaving the website. In some embodiments, the user may perform the actions using one or more input devices (e.g., the user input device 102).

In some embodiments, a message tracker 202 may receive messages of the user's browser 201 based on content displayed and the user's activities within a browsing session. For example, in some embodiments, during the browsing session, once the user performed an activity through the browser (e.g., viewing content, placing an order), the message tracker 202 may receive a message corresponding to the performed activity. In some embodiments, the message tracker 202 may track all user activities in the browsing session and generate a log reflecting all user activities. In some embodiments, the user activities may be represented as API calls to the website, such as an order-placing call, an add-to-cart call, a payment call, a like call, an add-to-list call, another suitable call, or any combination thereof.

In some embodiments, the message tracker 202 may include a processor (e.g., the processor 113). The message tracker 202 may apply one or more rules (e.g., the rules 141) to messages of a browsing session in determining whether the browsing session satisfies at least one rule. In such an event, the browsing session qualifies as an intelligent session recording (ISR) session, and may be tagged as "ISR sessions" and sent to a first database (e.g., MongoDB 203) for processing. The "MongoDB" in FIG. 2 is for illustrative purposes only, other types of databases may be deployed as well. In some embodiments, after applying the rules the message tracker 202 may decide, based on messages received, that the browsing session does not satisfy any of the rules. In such an event, the browsing session does not qualify as an ISR session, and may be tagged as "Standard/non-ISR sessions" and sent to a second database, (e.g., main data processing pipeline 207) for processing. In one example, user-initiated sessions may be marked as "ISR" sessions while the others (such as website server-initiated sessions) may be marked as "Standard/non-ISR sessions."

In some embodiments, browsing sessions tagged as "ISR sessions" and their corresponding messages may be stored in a MangoDB 203, a temporary storage/staging area, for further data processing. In some embodiments, the MangoDB 203 may be a cross-platform document-oriented database program that uses JSON-like documents with optional schemas. In some embodiments, the first database 111 may be partially or entirely implemented using MangoDB 203. In some other embodiments, the MangoDB 203 may be supplemented or substituted by other storage systems, such as one or more memory units (e.g., flash memory card, random access memory (RAM), or read-only memory (ROM).

In some embodiments, at step 204, a status checker (e.g., Is session over?) may determine whether one or more given browsing sessions are terminated (e.g., whether one or more browsing sessions stored in MongoDB 203 are terminated or still in progress). In some embodiments, the status checker may include a processor (e.g., the processor 113). At step 204, the status checker may perform various methods in determining the status of the one or more browsing sessions.

For example, at step 204, the status checker may determine a status of a browsing session based on a timestamp. In some embodiments, the status checker may determine a current timestamp that indicates a current time. For each browsing session being checked, the status checker may identify a most recently received message of the one browsing session, and determine a timestamp of a time when the most recently received message was received by the message tracker 202. The status checker may then determine a time difference between the timestamp of the most recently revived message and the current timestamp. In some embodiments, the status checker may determine that the time difference is greater than a threshold (e.g., 30 minutes), and thus determine that the browsing session has been terminated.

As another example, at step 204, the status checker may determine a status of a browsing session based on a campaign source (e.g., a URL address) of the browsing session. In some embodiments, the status checker may extract the campaign source information from a most recently received message of the browsing session. The status checker may compare the campaign source information of the most recently received message to campaign source information of a previously received message. In some embodiments, the status checker may determine that the campaign source information of the two messages is different, and thus determine that the browsing session has been terminated and a new browsing session has just started.

In some embodiments, at step 204, after performing the one or more methods stated above, for each browsing session, the status checker may output a boolean value that indicates the status of the browsing session. In some embodiments, the status checker may output a boolean value "1," which indicates that the browsing session is terminated. In some other embodiments, the status checker may output a boolean value "0," which indicates that the browsing session is still in progress. In such an event, the status checker may perform the one or more above-stated methods at a pre-determined frequency (e.g., every minute) to determine the status of the in-progress browsing session until the in-progress browsing session is terminated and the status checker outputs a value of "1."

In some embodiments, the selective session processor 205 may contain one or more processors (e.g., the processor 113) to fetch browsing sessions that are terminated. For example, after each session is determined as terminated at step 204, the corresponding session ID may be sent to the selective session processor 205 to notify the termination of the session. The selective session processor 205 may fetch the terminated session in a real-time manner or a delayed manner (e.g., using batch processing).

In some embodiments, the selective session processor 205 may improve the efficiency of the computer device 11*a* (e.g., data fetching) by processing the terminated browsing sessions in batches. Data fetching in batches reduces the number of requests/commands to be sent to the first database as well as the number of lookups to be performed by the first database. In some embodiments, the selective session processor 205 may count a number of terminated browsing sessions currently stored in the first database (e.g., the MongoDB 203). The selective session processor 205 may continuously update a counter that represents the number of terminated browsing sessions in the first database. The selective session processor 205 may contain a pre-determined threshold number of sessions (e.g., 2000 terminated browsing sessions) that the selective session processor 205 may process as a batch. In some embodiments, the selective session processor may determine that the counter exceeds the predetermined threshold, and thus the counted terminated browsing sessions may be processed and fetched as a batch. In such cases, the counted terminated browsing sessions and their corresponding messages may be fetched, by the computer device (e.g., the computer device 11*a*), as a batch from the first database (e.g., the MongoDB 203).

In some embodiments, the selective session processor 205 may also implement a timer for fetching terminated browsing sessions from the first database. For example, when the timer is up, the selective session processor 205 may send a fetching command to fetch the terminated browsing sessions, regardless of the number of the sessions being fetched. In some embodiments, both the timer and the above-described counter may be implemented, with the timer possessing a higher priority than the counter.

In some embodiments, the selective session processor 205 may selectively fetch terminated sessions from the first database 203. For example, the selective session processor 205 may skip fetching a terminated browsing session based on a sampling rate. A sampling rate of 10% may indicate that the selective session processor 205 has a 90% chance to skip fetching an incoming browsing session. In some embodiments, if the selective session processor 205 determines a terminated browsing session should be skipped, it may (1) send a command to the first database to remove the corresponding records from the first database or (2) mark the records as removed so that they can be removed at a garbage collection phase to avoid generating orphan data in the first database.

In some embodiments, the selective session processor 205 may fetch terminated browsing sessions in a selective way based on one or more intelligent rules (such as the above-mentioned sampling rate) as defined by a website's owner. For example, an owner of an eCommerce website that has 10 million browsing sessions per month but only has budgeted for 2 million sessions may define the following rules to collect and process the most useful sessions: (1) 500,000 sessions where users clicked add to cart but did not place the order; (2) 500,000 sessions where users placed orders during the browsing sessions; and (3) 1 million sessions based on a 10% random sampling. A terminated browsing session that satisfies any one of the rules may be selected and fetched by the selective session processor 205 from the first database.

In some embodiments, the generated rules may be stored in memory 112 as the rules 141. The stored rule may define a mapping relationship between one or more logically combined user actions (represented as API calls to a website server) and a tag. For example, the above rule (1) may define that a session with an API call of "clicking add to cart" but without an API call of "making a payment" is mapped to a tag "add-to-cart." The above rule (2) may define that a session with an API call of "payment" is mapped to a tag "purchasers."

In some embodiments, some tags may not be mapped to any user activities. For example, the above rule (3) may tag a session with "sampled" based on a sampling rate. That is, the selective session processor 205 may apply two different types of tags to the terminated browsing sessions. One type of tags is determined based on the user activities in the session, and the other type of tags is determined based on predefined parameters, such as sampling rate, time window, etc.

In some embodiments, at step 206, the selective session processor 205 may apply one or more rules (e.g., the rules 141) to the API calls in the messages of a terminated browsing session (e.g., a browsing session with the tag "terminated") to determine one or more tags to attach to the session. For instance, the API calls representing user actions in the messages of the terminated browsing session may be searched, and the corresponding tags may be attached to the session.

For example, at step 206, based on messages of a terminated browsing session, the selective session processor 205 may determine that during a terminated browsing session, the user of the website made a purchase (e.g., with an API call of "payment"). Therefore, the selective session processor 205 may determine that the browsing session satisfies a rule that requires a purchase was made during the browsing session. Corresponding to the rule, the selective session processor 205 may then tag the terminated browsing session with a tag "purchasers."

For another example, at step 206, the selective session processor 205 may determine that a terminated browsing session is processed and stored based on a random sampling rate pre-determined by the website's owner. The purpose of performing random sampling may include avoiding biases in the selection process. For instance, a conversion rate (e.g., from browsing to making a payment) may better be determined based on randomly sampled sessions, rather than sessions containing payments. In such an event, the selective session processor 205 may tag the terminated browsing session with one or more third tags (e.g., the tag "sampled") to reflect that the terminated browsing session is selected based on a sampling rate.

In some embodiments, at step 206, the selective session processor 205 may determine whether a terminated browsing session belongs to a specified user group before fetching it. For instance, the selective session processor 205 may fetch those terminated browsing sessions from paid members (or registered members) only.

In some embodiments, the terminated browsing sessions with one or more tags 124 may be stored into a main data processing pipeline 207 for data analysis. In some embodiments, the second database 114 may include the main data processing pipeline 207. In some embodiments, the main data processing pipeline 207 may be any storage system, such as one or more memory units (e.g., flash memory card, random access memory (RAM), or read-only memory (ROM)).

The method 200 may have the following technical advantages. In some embodiments, the terminated browsing sessions are filtered and selectively fetched from the first database for tagging. The fetching may be performed in a delayed manner and/or as batch processing to reduce data traffic and improve efficiency. In some embodiments, each fetched browsing session may be attached with one or more tags. It means one browsing session may be used in different types of analysis requests. For instance, a browsing session with "purchasers" tag and "sampled" tag may be used in both "revenue" analysis (based on "purchasers" sessions) and "conversion rate" analysis (based on "sampled" sessions). Such reusable browsing sessions may significantly reduce the storage footprint of the historical data to be stored and analyzed.

Figure 3:
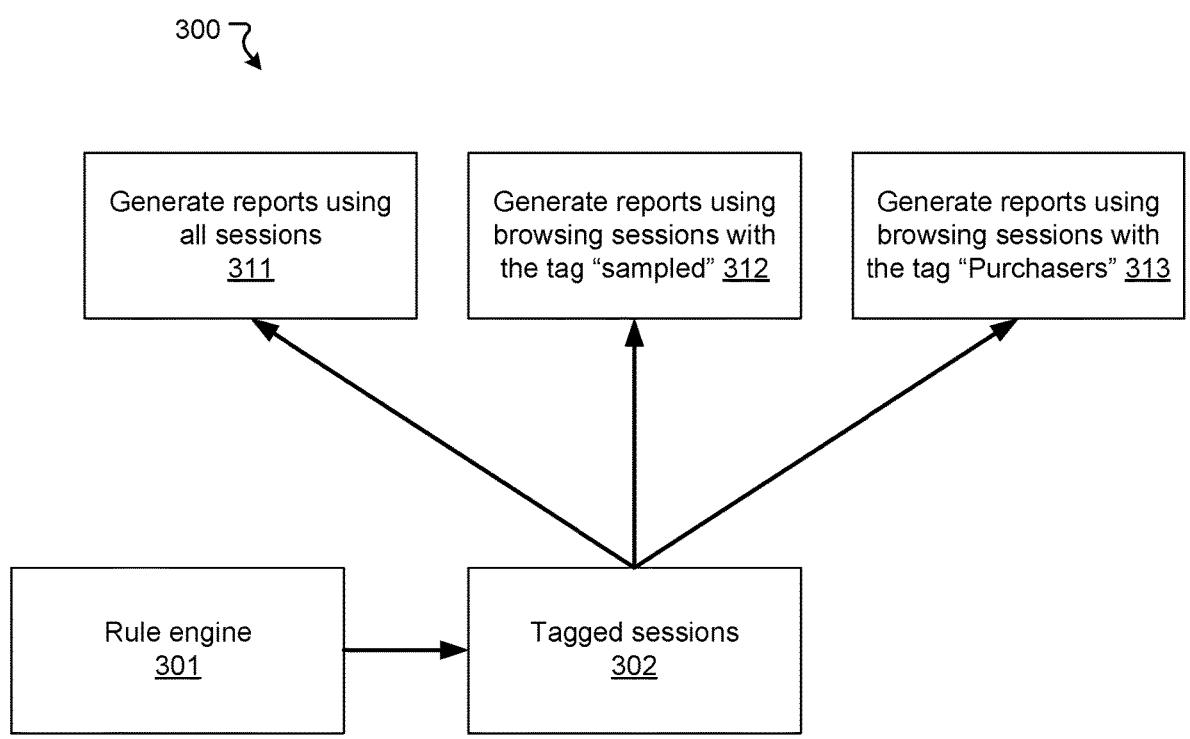
FIG. 3 illustrates an exemplary browsing sessions analysis method, in accordance with various embodiments of the disclosure.

FIG. 3 illustrates an exemplary browsing sessions analysis method 300, in accordance with various embodiments of the disclosure. The method 300 may process browsing sessions through a rule engine 301. The method 300 may be implemented in various environments including, for example, by the system 100 of FIG. 1. The exemplary method 300 may be implemented by one or more components of the system 100. For example, the rule engine 301 may store, retrieve, display, configure, or apply the rules 122 and may be deployed on one or more computing devices of the system 100. For example, a non-transitory computer-readable storage medium (e.g., the memory 112) may store instructions (e.g., the rules 141 and the tags 142) that, when executed by a processor (e.g., the processor 113), cause the system (e.g., the system 100) to perform the method 300. The operations of method 300 presented below are intended to be illustrative. Depending on the implementation, the exemplary system 300 may include additional, fewer, or alternative steps performed in various orders or in parallel.

In some embodiments, the rule engine 301 may receive a data analysis request made by a user of the system (e.g., the system 100) from a device (e.g., the computer devices 11*a*, 11*b*, 11*c* or the user devices 10*a*, 10*b*, 10*c*) of the network (e.g., the network 20). The rule engine 301 may, based on information contained in the data analysis request, determine one or more second tags (e.g., the tags 142) or rules (e.g., the rules 141) are associated with the data analysis request. In some embodiments, the rule engine 301 may compare tags of the one or more terminated browsing sessions stored in a second database (e.g., main data processing pipeline 207), and determine one or more terminated browsing sessions that are associated with the one or more second tags or rules. The rule engine 301 may then retrieve the determined one or more terminated browsing sessions from the second database in response to the data analysis request. In some embodiments, the rule engine 301 may return the retrieved one or more terminated browsing sessions as tagged sessions 302 for data analysis.

For example, an owner of an eCommerce website may want to understand the conversion rate (e.g., the percentage of visitors who purchased their browsing sessions) of his/her eCommerce website. The owner may send in a data analysis request through one of the devices (e.g., the computer devices 11*a*, 11*b*, 11*c* or the user devices 10*a*, 10*b*, 10*c*) via the network (e.g., the network 20). The rule engine 301 may determine, based on the data analysis request, that browsing sessions with second tags "purchase" (e.g., a tag for browsing sessions in which a user of the eCommerce website made a purchase) and second tags "all sessions" (e.g., a tag for all browsing sessions in a given period) are associated with the data analysis request (e.g., determining the conversion rate). The rule engine 301 may compare tags of the one or more terminated browsing sessions stored in the main data processing pipeline 207 to the determined second tags, and determine terminated browsing sessions that are associated with the second tags for the conversion rate analysis. The rule engine 301 may then retrieve the one or more terminated browsing sessions from the main data processing pipeline 207, and return the retrieved one or more terminated browsing sessions as tagged sessions 302 for the conversion rate analysis.

In some embodiments, the tagged sessions 302 may be stored in a non-transitory computer-readable storage medium (e.g., the second database 114). In some embodiments, a user may request a data analysis through a computer device or a user device. A processor (e.g., the processor 113) may determine one or more second tags (e.g., the tag "purchasers", the tag "sampled") that are associated with the data analysis request, and retrieve one or more terminated browsing sessions from the non-transitory computer-readable storage medium (e.g., the second database 114) in response to the data analysis request. In some embodiments, the processor (e.g., the processor 113) may return the one or more terminated browsing sessions as a response to the data analysis request, and generate one or more data analysis reports using browsing sessions with the associated tags. For example, based on details of the data analysis request, a processor (e.g., the processor 113) may generate reports using all sessions 311, may generate reports using browsing sessions with the tag "sampled" 312, and/or generate reports using browsing sessions with the tag "purchase" 313, etc.

The method 300 may have the following technical advantages. In some embodiments, an owner of a website may want to understand the conversion rate (e.g., how many users visiting the website end up placing an order) and other performance indicators of the website. After tagging the browsing sessions with different tags (e.g., a "purchase" tag for browsing sessions where users placed the order), the owner may select a user session with associated tags for a desired data analysis. Performing data analysis by selecting tags of desired datasets may dramatically improve data analysis efficiency of the computer and avoid biased analysis. For example, to understand the conversion rate of the website, only browsing sessions with the "purchasers" tag may be selected in the calculation process.

Figure 4:
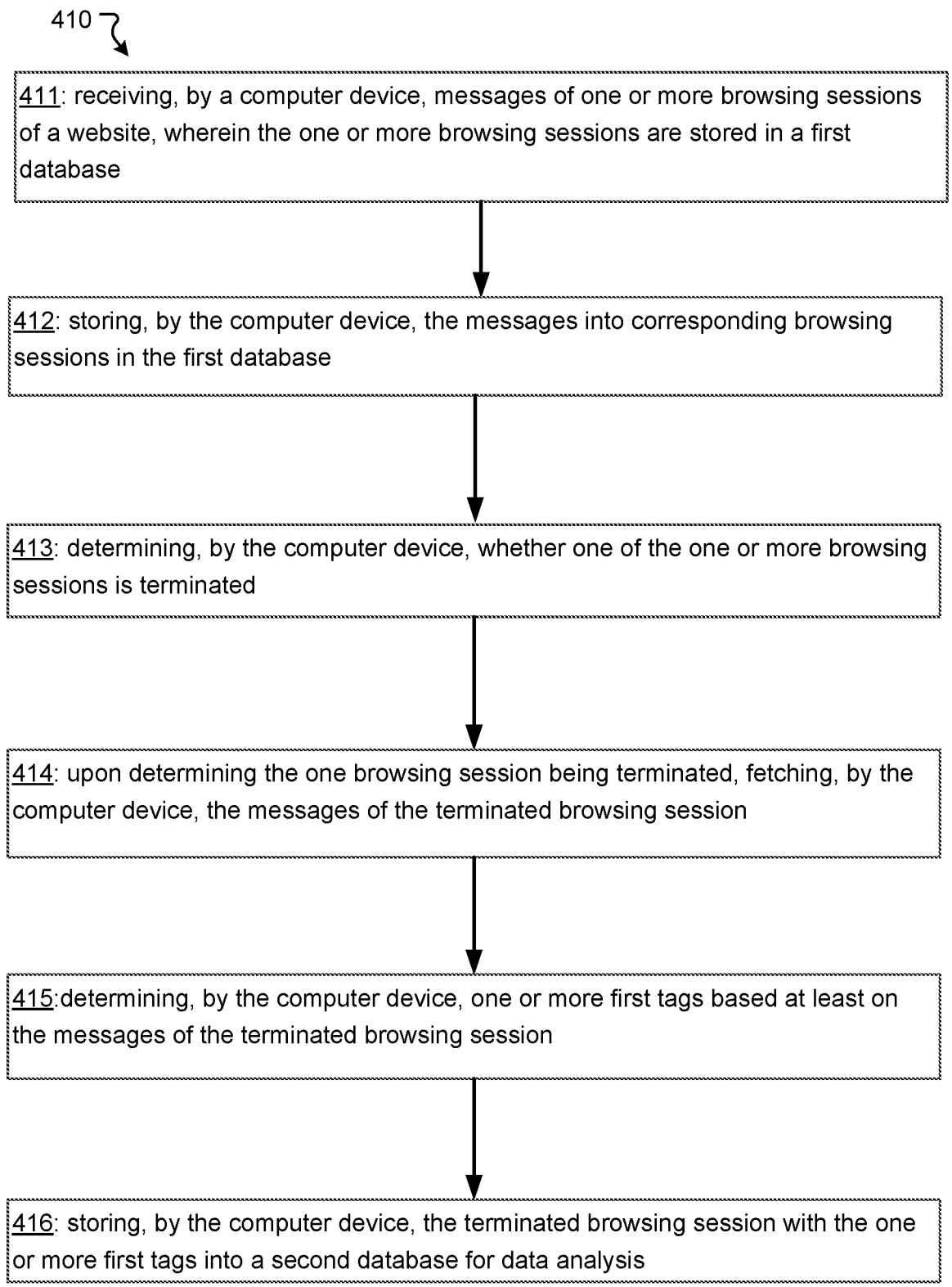
FIG. 4 illustrates an exemplary method for processing browsing sessions of a website, according to various embodiments of the present disclosure.

FIG. 4 illustrates an exemplary method 410 for processing browsing sessions of a website, according to various embodiments of the present disclosure. The method 410 may be implemented in various environments including, for example, by the system 100 of FIG. 1. The exemplary method 410 may be implemented by one or more components of the system 100. For example, a non-transitory computer-readable storage medium (e.g., the memory 112) may store instructions (e.g., the rules 141 and the tags 142) that, when executed by a processor (e.g., the processor 113), cause the system 100 (e.g., the processor 113) to perform the method 410. The operations of method 410 presented below are intended to be illustrative. Depending on the implementation, the exemplary method 410 may include additional, fewer, or alternative steps performed in various orders or in parallel.

Block 411 includes receiving, by a computer device, messages of one or more browsing sessions of a website.

Block 412 includes storing, by the computer device, the messages into corresponding browsing sessions in a first database.

Block 413 includes determining, by the computer device, whether one of the one or more browsing sessions is terminated.

Block 414 includes upon determining the one browsing session being terminated, fetching, by the computer device, the messages of the terminated browsing session.

Block 415 includes determining, by the computer device, one or more first tags based at least on the messages of the terminated browsing session.

Block 416 includes storing, by the computer device, the terminated browsing session with the one or more first tags into a second database for data analysis.

In some embodiments, the website may be an eCommerce website. In such an event, messages of one or more browsing sessions may comprise actions taken by a user who visited the eCommerce website, and statuses of the browsing sessions.

Figure 5:
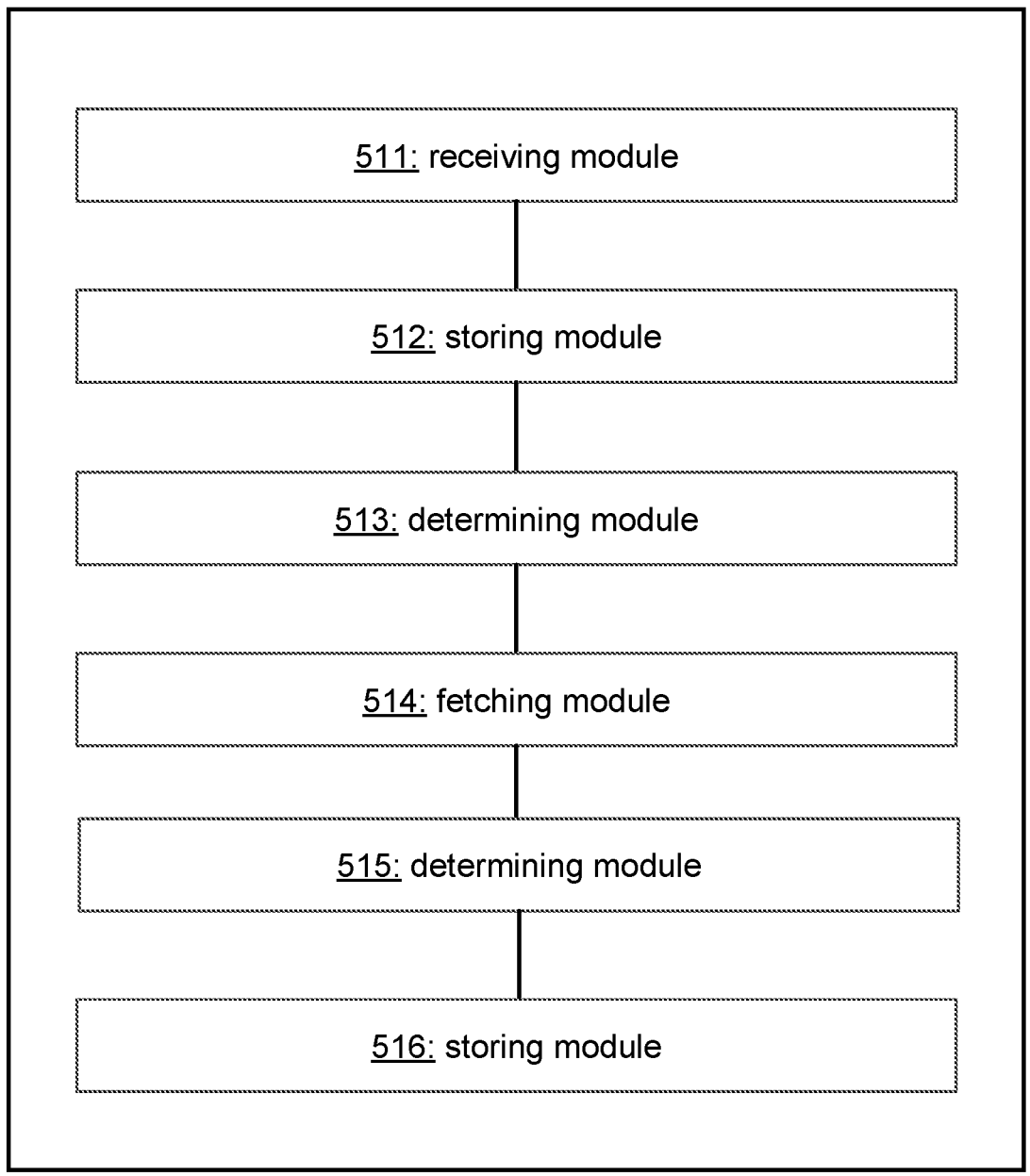
FIG. 5 illustrates a block diagram of an exemplary computer system for processing browsing sessions of a website, in accordance with various embodiments of the present disclosure.

FIG. 5 illustrates a block diagram of an exemplary computer system 510 for processing browsing sessions of a website, in accordance with various embodiments of the present disclosure. The system 510 may be an exemplary implementation of the system 100 of FIG. 1 or one or more similar devices. The method 410 may be implemented by the computer 510. The computer system 510 may include one or more processors and one or more non-transitory computer-readable storage media (e.g., one or more databases) coupled to the one or more processors and configured with instructions executable by the one or more processors and configured with instructions executable by the one or more processors to cause the system or device (e.g. the processor) to perform the method 410. The computer system 510 may include various units/modules corresponding to the instructions (e.g., software instructions). In some embodiments, the instructions may correspond to a software such as a desktop software or an application (APP) installed on a desktop, a laptop, a mobile phone, a pad, etc.

In some embodiments, the computer system 510 may include a receiving module 511 to receive, by a computer device, messages of one or more browsing sessions of a website, wherein the one or more browsing sessions are stored in a first database; a storing module 512 to store, by the computer device, the messages into corresponding browsing sessions in the first database; a determining module 513 to determine, by the computer device, whether one of the one or more browsing sessions is terminated; a fetching module 514, upon determining the one browsing session being terminated, to fetch, by the computer device, the messages of the terminated browsing session; a determining module 515 to determine, by the computer device, one or more first tags based at least on the messages of the terminated browsing session; and a storing module 516 to store, by the computer device, the terminated browsing session with the one or more first tags into a second database for data analysis.

Figure 6:
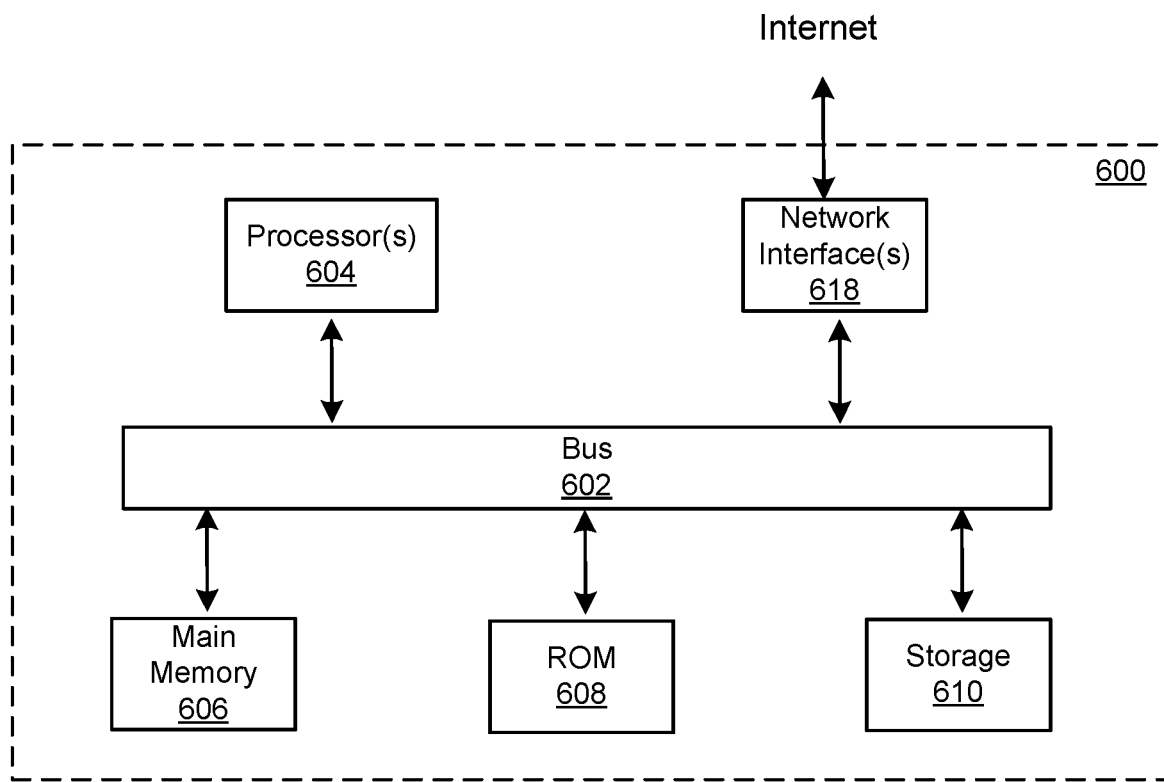
FIG. 6 illustrates a block diagram of an exemplary computer system in which any of the embodiments described herein may be implemented, in accordance with various embodiments of the present disclosure.

FIG. 6 is a block diagram that illustrates a computer system 600 upon which any of the embodiments described herein may be implemented, in accordance with various embodiments of the present disclosure. The system 600 may correspond to the method 100 or the computing device 11*a*, 11*b*, or 11*c* described above. The computer system 600 includes a bus 602 or another communication mechanism for communicating information, one or more hardware processors 604 coupled with bus 602 for processing information. Hardware processor(s) 604 may be, for example, one or more general-purpose microprocessors.

The computer system 600 also includes a main memory 606, such as a random access memory (RAM), cache, and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The computer system 600 further includes a read-only memory (ROM) 608 or other static storage device coupled to bus 602 for storing static information and instructions for processor 604. A storage device 610, such as a magnetic disk, optical disk, or USB thumb drive (flash drive), etc., is provided and coupled to bus 602 for storing information and instructions.

The computer system 600 may implement the techniques described herein using customized hard-wired logic, one or more ASICs or FPGAs, firmware, and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage 610 may include non-transitory storage media. The term "non-transitory media," and similar terms, as used herein refers to a media that stores data and/or instructions that cause a machine to operate in a specific fashion. The media excludes transitory signals. Such non-transitory media may include non-volatile media and/or volatile media. Non-volatile media includes, for example, optical or magnetic disks, such as storage device 610. Volatile media includes dynamic memory, such as main memory 606. Common forms of non-transitory media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic, or optical signals that carry digital data streams representing various types of information.

The computer system 600 can send messages and receive data, including program code, through the network(s), network link, and network interface 618. In the Internet example, a server might transmit a requested code for an application program through the Internet, the ISP, the local network, and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors including computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be included in program codes or instructions stored in a memory (e.g., a non-transitory computer-readable storage medium described above). Such an algorithm may include a document outlining algorithm. In some embodiments, a document outlining algorithm may explicitly program computers to perform a function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS).

Any process descriptions, elements, or blocks in the flow diagrams described herein and/or depicted in the attached figures should be understood as potentially representing modules, segments, or portions of code that include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
receiving and storing, by a computer device, messages of a plurality of browsing sessions of a website in a first database;
determining, by the computer device, whether one or more of the plurality of browsing sessions are terminated based on the messages;
determining, by the computer device, whether a timer for fetching terminated browsing sessions is expired, and fetching the messages of the one or more terminated browsing sessions if the timer is expired;
in response to the timer is not expired, determining, by the computer device, that a number of the one or more terminated browsing sessions is greater than a threshold, and fetching, by the computer device, the messages of the one or more terminated browsing sessions as a batch;
determining, by the computer device, one or more tags for the one or more terminated browsing sessions based on the fetched messages, wherein the determining comprises:
selecting a first number of terminated browsing sessions from the one or more terminated browsing sessions based at least on applying a rule to the messages of the one or more terminated browsing sessions;
selecting a second number of terminated browsing sessions based on a sampling rate;
assigning to each of the first number of terminated browsing sessions a first tag corresponding to the rule, and assigning to each of the second number of terminated browsing sessions a second tag, and
storing, by the computer device, the one or more terminated browsing sessions with the one or more tags into a second database for data analysis.

2. The method of claim 1, further comprising:
receiving a data analysis request;
determining one or more requesting tags associated with the data analysis request;
retrieving a terminated browsing session from the second database if the one or more tags of the terminated browsing session match the one or more requesting tags; and
returning the terminated browsing session in a response to the data analysis request.

3. The method of claim 1, wherein determining one or more tags comprises:
searching the messages for one or more user actions represented as API calls to the website that satisfy the rule.

4. The method of claim 3, wherein the API calls comprise at least one of an order-placing call, an add-to-cart call, a payment call, a like call, or an add-to-list call.

5. The method of claim 1, wherein receiving messages of one or more browsing sessions of the website comprises:
monitoring activity of at least one of a mouse, a cursor, a keyboard, a microphone, or a touch sensor.

6. The method of claim 1, wherein the determining a browsing session being terminated comprises:
identifying a most recently received message of the one browsing session;
determining a time difference between a timestamp of the most recently received message and a current timestamp; and
in response to the time difference being greater than a second threshold, determining the one browsing session as terminated.

7. The method of claim 1, further comprising:
updating a counter representing the number of terminated browsing sessions in the first database, wherein
the determining that a number of terminated browsing sessions in the first database is greater than the threshold comprises:
comparing the counter against the threshold.

8. A system comprising one or more processors and one or more non-transitory computer-readable memories coupled to the one or more processors and configured with instructions executable by the one or more processors to cause the system to perform operations comprising:
receiving and storing messages of a plurality of browsing sessions of a website in a first database;
determining whether one or more of the plurality of browsing sessions are terminated based on the messages;
determining whether a timer for fetching terminated browsing sessions is expired, and fetching the messages of the one or more terminated browsing sessions if the timer is expired;
in response to the timer is not expired, determining that a number of the one or more terminated browsing sessions is greater than a threshold, and fetching the messages of the one or more terminated browsing sessions as a batch;
determining one or more tags for the one or more terminated browsing sessions based on the fetched messages, wherein the determining comprises:
selecting a first number of terminated browsing sessions from the one or more terminated browsing sessions based at least on applying a rule to the messages of the one or more terminated browsing sessions;

selecting a second number of terminated browsing sessions based on a sampling rate;

assigning to each of the first number of terminated browsing sessions a first tag corresponding to the rule, and assigning to each of the second number of terminated browsing sessions a second tag; and storing the one or more terminated browsing sessions with the one or more tags into a second database for data analysis.

9. The system of claim 8, further comprising:

receiving a data analysis request;

determining one or more requesting tags associated with the data analysis request;

retrieving a terminated browsing session from the second database if the one or more tags of the terminated browsing session match the one or more requesting tags; and returning the terminated browsing session in a response to the data analysis request.

10. The system of claim 8, wherein determining one or more tags comprises:

searching the messages for one or more user actions represented as API calls to the website that satisfy the rule.

11. The system of claim 10, wherein the API calls comprise at least one of an order-placing call, an add-to-cart call, a payment call, a like call, or an add-to-list call.

12. The system of claim 8, wherein receiving messages of one or more browsing sessions of the website comprises:

monitoring activity of at least one of a mouse, a cursor, a keyboard, a microphone, or a touch sensor.

13. The system of claim 8, wherein the determining a browsing session being terminated comprises:

identifying a most recently received message of the one browsing session;

determining a time difference between a timestamp of the most recently received message and a current timestamp; and in response to the time difference being greater than a second threshold, determining the one browsing session as terminated.

14. The system of claim 8, further comprising:

updating a counter representing the number of terminated browsing sessions in the first database, wherein the determining that a number of terminated browsing sessions in the first database is greater than the threshold comprises:

comparing the counter against the threshold.

15. One or more non-transitory computer-readable storage media storing instructions executable by one or more processors, wherein execution of the instructions causes the one or more processors to perform operations comprising:

receiving and storing messages of a plurality of browsing sessions of a website in a first database;

determining whether one or more of the plurality of browsing sessions is terminated based on the messages;

determining whether a timer for fetching terminated browsing sessions is expired, and fetching the messages of the one or more terminated browsing sessions if the timer is expired; in response to the timer is not expired, determining that a number of the one or more terminated browsing sessions in the first database is greater than a threshold, and fetching the terminated browsing sessions as a batch;

determining one or more tags based at least on the messages of the one or more terminated browsing sessions based on the fetched messages, wherein the determining comprises:

selecting a first number of terminated browsing sessions from the one or more terminated browsing sessions based at least on applying a rule to the messages of the one or more terminated browsing sessions;

selecting a second number of terminated browsing sessions based on a sampling rate;

assigning to each of the first number of terminated browsing sessions a first tag corresponding to the rule, and assigning to each of the second number of terminated browsing sessions a second tag; and storing the one or more terminated browsing sessions with the one or more tags into a second database for data analysis.

16. The one or more non-transitory computer-readable storage media of claim 15, wherein determining one or more tags comprises:

searching the messages for one or more user actions represented as API calls to the website that satisfy the rule.

17. The one or more non-transitory computer-readable storage media of claim 15, wherein the determining a browsing session being terminated comprises:

identifying a most recently received message of the one browsing session;

determining a time difference between a timestamp of the most recently received message and a current timestamp; and in response to the time difference being greater than a second threshold, determining the one browsing session as terminated.

* * * * *